United States Patent [19]
Martin

[11] 3,930,283
[45] Jan. 6, 1976

[54] MACHINE FOR REMOVING SKIN FROM PIECES OF POULTRY

[75] Inventor: Eugene G. Martin, Ephrata, Pa.

[73] Assignee: Victor F. Weaver, Inc., New Holland, Pa.

[22] Filed: Oct. 15, 1974

[21] Appl. No.: 514,758

Related U.S. Application Data

[63] Continuation-in-part of Ser. No. 394,924, Sept. 6, 1973, abandoned.

[52] U.S. Cl. .................. 17/11; 17/21; 17/50; 99/585
[51] Int. Cl.² .................................. A22C 21/00
[58] Field of Search ............ 17/11, 21, 50, 11.3, 25, 17/26; 99/585, 623, 628, 540, 584

[56] References Cited
UNITED STATES PATENTS

| | | | |
|---|---|---|---|
| 2,630,599 | 3/1953 | Grant et al. | 17/11 UX |
| 3,119,144 | 1/1964 | Hill | 17/11 |
| 3,159,872 | 12/1964 | Hill | 17/11 X |
| 3,172,148 | 3/1965 | Hill | 17/11 |
| 3,406,425 | 10/1968 | Hill | 17/11 |
| 3,480,991 | 12/1969 | Edwards, Sr. | 17/11 |
| 3,579,714 | 5/1971 | Edwards, Sr. | 17/11 |
| 3,629,902 | 12/1971 | Leonard | 17/11 |
| 3,714,682 | 2/1973 | Harben, Jr. | 17/11 |
| 3,805,328 | 4/1974 | Strandine et al. | 17/11 |

Primary Examiner—Anton O. Oechsle
Assistant Examiner—Arnold W. Kramer
Attorney, Agent, or Firm—C. Hercus Just

[57] ABSTRACT

A poultry processing machine adapted to remove skin from certain parts of poultry, such as necks, thighs and breasts by arranging the same for passage along a substantially uniformly diminishing channel defined by the upper portions of a pair of rollers having spiral configurations thereon, guiding and feeding the pieces of poultry longitudinally along said channel, and the spiral configuration on the rolls engaging the skin on said pieces in a manner to pull the same therefrom in substantially intact condition from the pieces, and separately discharging the removed skins and pieces of poultry adjacent the exit end of the machine.

15 Claims, 12 Drawing Figures

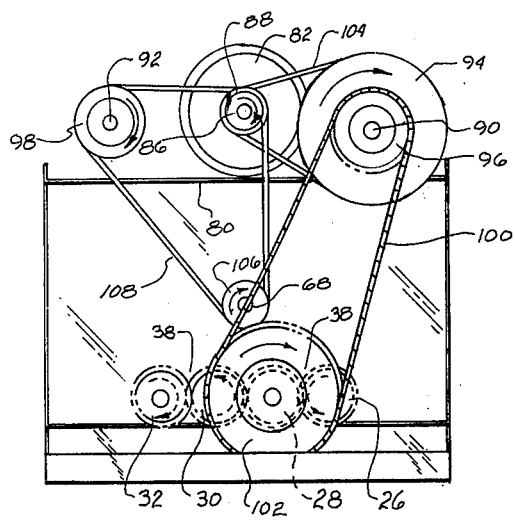
Fig. 3
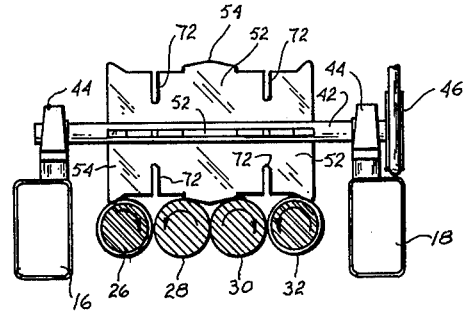
Fig. 4
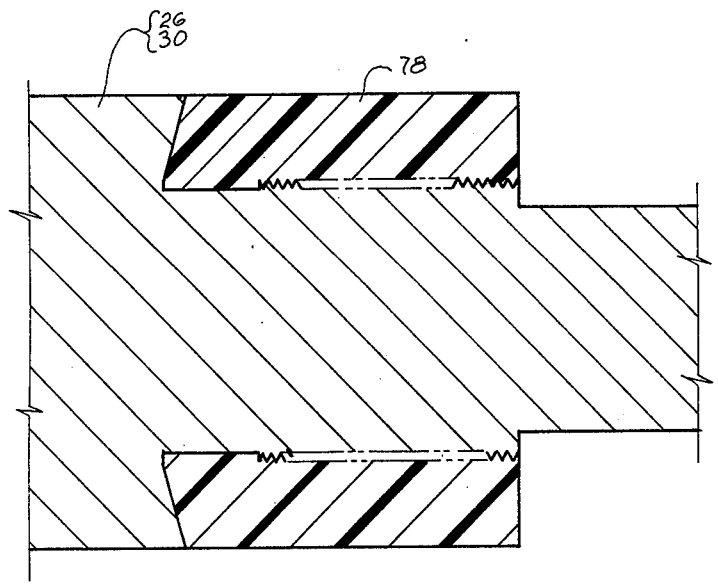
Fig. 6
Fig. 5
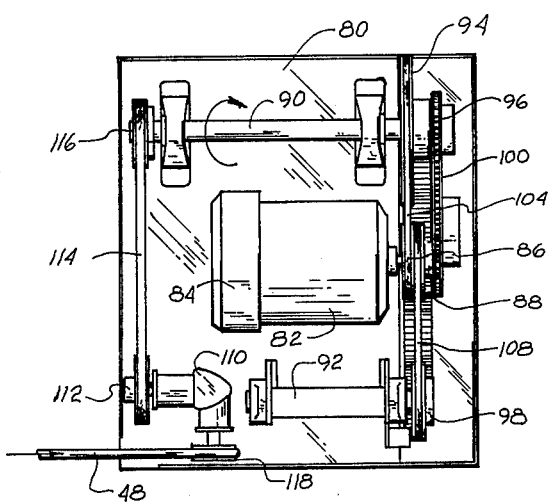
Fig. 7

MACHINE FOR REMOVING SKIN FROM PIECES OF POULTRY

BACKGROUND OF THE INVENTION

This application is a Continuation-in-Part of Ser. No. 394,924, filed Sept. 6, 1973, and now abandoned.

In processing poultry for market, it is common practice at present to disect the poultry carcass into various sections, such as breasts, wings, legs and thighs. Commerical sale of these is very popular. However, the portions of the carcass, such as the back and necks, which are less desirable commerically, usually are used in poultry canning establishments to form such items as chicken loaves, intermixed in soups of various kinds, and otherwise. It now has been found, that there is a market for the skin from the necks and other pieces of the carcasses of poultry, especially if said skin can be furnished to further processing establishments substantially in intact condition. The purpose of the present invention is to fulfill this demand by a machine capable of separating the skin from certain parts or pieces of poultry, such as necks, thighs and breasts, in an intact condition, details of which are set forth hereinafter.

Removing skin or material resembling skin from certain poultry organs has resulted heretofore in the development of machines to accomplish the same, several examples of which are referred to below. Certain vital organs, such as the gizzard, have a very tough skin upon the same which preferably must be removed in order to popularize the sale of prepared gizzards and the like or permit the use of the same in certain food items. Under such circumstances, preservation of the skin is immaterial and therefore the same may be torn, decimated, or otherwise mutilated or macerated incident to removing the same from the desired portions of the gizzards. Machines to accomplish the removal of skin from gizzards comprise the subject matter of a number of patents, one of which is U.S. Pat. No. 3480,991, to J. C. Edwards Sr., dated Dec. 2, 1969, and the other is a more recent U.S. Pat. to said patentee, No. 3,579,714, issued May 25, 1971. Other similar patents are U.S. Pat. No. 3,159,872, to C. J. Hill, dated Dec. 8, 1964, and U.S. Pat. No. 3,406,425, to C. J. Hill, dated Oct. 22, 1968.

The machines described and illustrated in said aforementioned patents include pairs of parallel rolls having intermeshing spiral configurations thereon somewhat resembling elongated herringbone gears. The machines include means for slitting the skin and as the gizzards move along the path between the spiral configurations of the rolls, the skin is engaged between the intermeshing configurations of the rolls and separation of the skin from the desired portions of the gizzards occurs by tearing the skin in a manner which macerates it into small bits and pieces. Accordingly, it has been found that machines of this type are not suitable to achieve the applicant's purpose with respect to removing, in substantially intact condition, the skin from certain parts or pieces of poultry such as the necks, thighs and breasts, as well as possibly other pieces.

SUMMARY OF THE INVENTION

It is the principal object of the present invention to provide a processing machine adapted to remove substantially in intact condition the skin from certain parts or pieces of poultry, such as the necks, thighs and breasts, by use of at least a pair of rolls having substantially parallel axes and spiral configurations thereon extending in opposite direction, the peripheries of said configurations being spaced from each other a slight distance adjacent the inlet end of the machine and substantially in rolling contact adjacent the exit end of the machine, and thus providing a channel or passage of substantially uniformly diminishing nature through which the skins are discharged. One embodiment of the machine includes preferably a disc knife intersecting the channel formed between the upper portions of the rolls and the cutting edge is disposed at a level adapted to slit the skin of the necks of poultry, following which the spiral configurations on the rolls engage the skin in a manner to maintain it in substantially intact condition and pass said skin through the space between said rolls so as not to damage or multilate it, the skinned necks then being conveyed to the discharge end of the machine. In another embodiment adapted to remove the skin from thighs, and breasts, chain type feeding means are provided which engage the upper surfaces of the same in a manner to hold the skin on the pieces against the spiral rolls for removal thereof from the pieces.

It is another object of the invention to provide the embodiment which operates upon necks, regarding the neck-orienting portion of the machine, with a plurality of radially extending blades connected to a shaft disposed transversely across the channel defined by the upper portions of the pair of rolls along which the necks are moved, the ends of said blades being substantially complementary to the cross-sectional configuration of said channel formed by the peripheries of said rolls.

Ancillary to the foregoing object, it is a further object of the invention to position the neck-orienting unit of the machine adjacent the slitting knife and provide slots in the blades comprising said orienting means to accommodate the periphery of said knife when the orienting means and the knife are operating.

It is a further object of the invention to provide a varying space between the peripheries of the spiral configurations on the rolls which is greater adjacent the inlet end than at the discharge end by employing one roll of substantially uniform diameter throughout the entire length thereof, and the co-operating roll being tapered with the smaller diameter end adjacent the inlet end of the machine, while the axes of the rolls are substantially parallel to each other.

It is still another object of the invention to provide power means mounted preferably in the upper portion of the machine nearer the exit end than the inlet end and including an electric motor and transmission means including endless belts or chains extending around suitable pulleys or sprocket gears, whereby the single motor drives all of the movable supplementary means of the machine, such as the positioning and feeding means, the neck-orienting unit and the slitting knife, in addition to operating the rolls with spiral configurations thereon.

It is a still futher object of the invention to provide another embodiment of the machine adapted to remove skin from parts of poultry which require no slitting and in which driven means engage the upper surface of said pieces of poultry, which are positioned on the spiral rolls with skin lowermost, and hold said skin in firm contact with said rolls for removal of the skin thereby from said pieces of poultry.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 3 is a vertical elevation of the exit end of the machine shown in FIGS. 1 and 2 as seen on the line 3—3 of FIG. 2.

FIG. 4 is a vertical sectional view of machine shown in FIGS. 1 and 2 as seen on the line 4—4 of FIG. 2.

FIG. 5 is an exemplary vertical sectional view of one of the pairs of channel-forming rolls illustrating the manner in which a poultry neck is received therein, as seen on the line 5—5 of FIG. 2.

FIG. 6 is a fragmentary, vertical sectional view of the end of one of the rolls mounted adjacent the exit end of the machine and illustrating details of a synthetic resin collar mounted on the exit of the metal roll, as viewed on the line 6—6 of FIG. 2.

FIG. 7 is a top plan view of the power and drive mechanism of the machine shown in FIG. 1 as seen on the line 7—7 thereof.

DETAILED DESCRIPTION

It is to be understood that the present invention is adapted to remove the skin from certain parts or pieces of poultry, including necks, thighs and breasts, as well as other parts and pieces having external skin thereon. Also, the term poultry is intended to be of a generic nature to include young and old chickens, i.e., fryers and larger and older chickens; ducks; geese; turkeys; and guineas.

Figure 1:
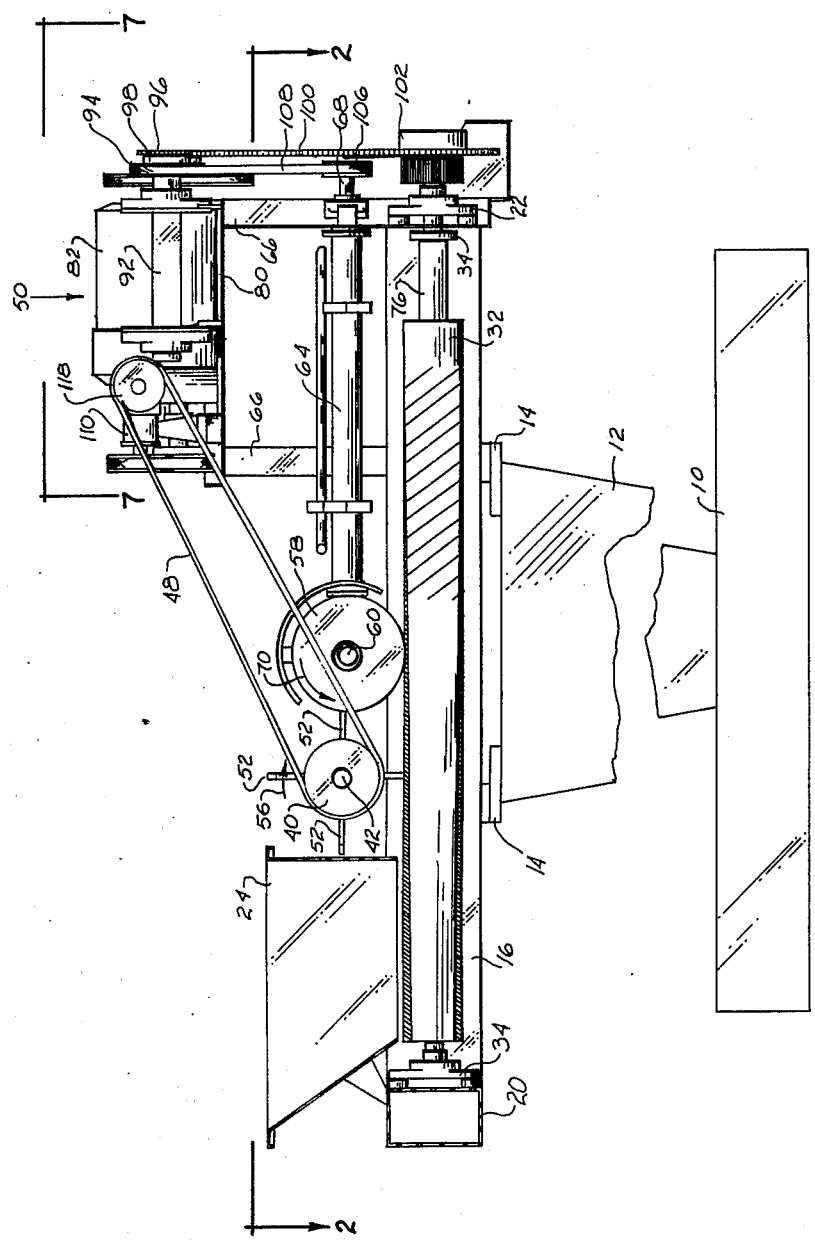
FIG. 1 is a side elevation of a poultry processing machine embodying the principals of one embodiment of the present invention, designed to operate upon the necks of poultry, certain of the shields and covers being omitted for purposes of disclosing details of the mechanism.

Referring to the drawings, in FIG. 1, the machine shown therein is one embodiment of the present invention adapted to operate upon separated poultry necks and comprises a suitable base 10 from which a pedestal 12 extends upwardly. If desired, a plurality of legs may be used in lieu of base 10 and pedestal 12, if desired. A pair of transversely extending frame members 14 are supported by the upper end of pedestal 12. Said members 14 extend between a pair of side frame members 16 and 18. These may be formed from any suitable structural material such as metal tubes of appropriate dimensions.

Extending between the opposite ends of the side frame members 16 and 18 are a pair of end frame members 20 and 22. End frame member 20 is adajcent the inlet end of the machine where a suitable hopper 24 is supported for purposes of receiving batches of chicken necks from which the skins are to be removed intact.

Figure 2:
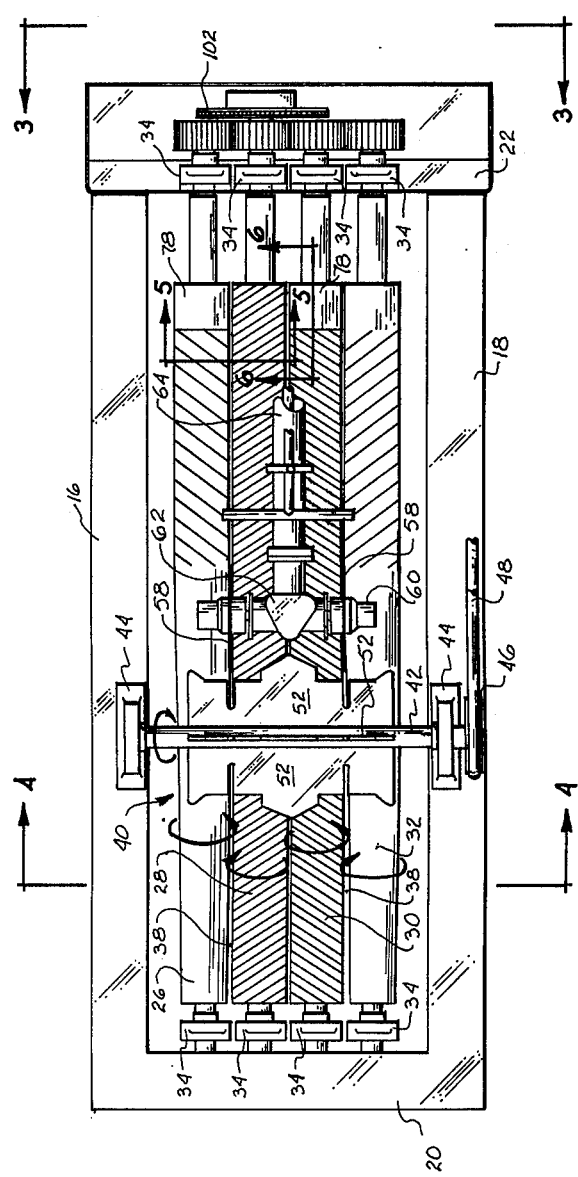
FIG. 2 is a top plan view of the machine shown in FIG. 1 substantially as seen on the line 2—2 thereof, part of the power mechanism being omitted to disclose details of the mechanism below said power means as seen in FIG. 1.

In the preferred construction of this embodiment of the machine, two pairs of co-operating rolls 26, 28 and 30, 32 are mounted. Each of said rolls have shafts extending respectively from the opposite ends thereof which are supported in appropriate bearings respectively supported by the end frame members 20 and 22. The rolls 26 and 32 of the respective pairs are similar, and correspondingly, the rolls 28 and 30 of the respective pairs likewise are similar but are different from the rolls 26 and 32. Each pair of rolls 26, 28 and 30, 32 have spiral ribs or configurations thereon which are best illustrated in FIG. 2. It will be seen however that the pitch of the spiral configurations on the rolls 26 and 32 are of a coarser nature than the configurations on the rolls 28 and 30. Also as seen best in FIG. 2, adjacent the inlet end of the machine which is nearest the end member 20, the surfaces of the rolls of each pair are slightly spaced from each other, while at the opposite, discharge end of the machine, the surfaces of the rolls are substantially in rolling contact with each other, thus providing a tapering channel and passage or space which substantially uniformly diminishes from the inlet end to the discharge end of each pair of rolls. Preferably, such arrangement is provided by forming the rolls 28 and 30, with the finer pitch of spiral configurations substantially cylindrical, whereas the rolls 26 and 32 with the coarser pitch of spiral configurations thereon, are slightly tapered, the smaller diameter being nearest the end member 20 and thereby form the gradually decreasing space from the inlet end to the exit end of the machine, for purposes to be described.

It will be seen also that the spiral configurations on the rolls of each pair thereof extend in opposite directions. Similarly, as shown by the indicating arrows in FIGS. 3 and 4, the rolls of each pair rotate in opposite rotary directions. Further, the directions of rotation in relation to the direction of the spirals on said rolls are such that as the rolls rotate, the poultry necks 36, see FIG. 5, which are to be skinned, are moved longitudinally along the channel 38, see FIG. 5, formed by the adjacent sides of the upper portions of the pairs of rolls 26, 28 and 30, 32.

When a supply of poultry necks 36 are loaded into the hopper 24, they gradually are disposed longitudinally along the channels 38 between said respective pairs of rolls as described above. It also can be visualized that there is a channel between the adjacent rolls 28 and 30 of the respective pairs thereof but these rolls are not intended to co-operate with each other and if poultry necks happen to become lodged therein, they would not be fed or positioned as intended. Accordingly, to prevent the possibility of poultry necks becoming lodged in the channel between the rolls 28 and 30, rotary neck orienting means are provided in the form of what might be considered a paddlewheel 40. Said orienting paddlewheel is best shown in plan view in FIG. 2 and in end elevation in FIG. 4. It consists of a shaft 42, the ends of which are supported in suitable bearings 44. A driven pulley or sprocket gear 46 is mounted on one end of the shaft for engagement by an endless belt or sprocket chain 48, which is driven by part of a power and transmission unit 50, details of which are described hereinafter.

The paddlewheel 40 also comprises a plurality of similar blades 52, of which four are shown in FIGS. 1, 2 and 4. Such number is not to be considered restrictive however. It also will be seen that the outer ends or edges of the blades 52 have central apex projections 54 which are positioned for movement within the channel between the rolls 28 and 30 from which poultry necks are to be excluded. Further, from FIG. 1, it will be seen that the paddlewheel 40 moves in the direction of the arrow 56, whereby it can be observed that the blades 52 and especially the apex projections thereon will kick the necks which happen to be disposed in the channel between rolls 28 and 30 rearwardly with respect to the feed direction afforded by the co-operating pairs of rolls 26, 28 and 30, 32. The speed with which the paddlewheel 40 is driven is arranged to be certain that no necks within the channel between rolls 28 and 30 will pass beyond the paddle-wheel toward the discharge end of the machine.

Closely associated with the paddlewheel 40 and disposed downstream therefrom, toward the discharge or exit end, is a pair of slitting knives 58 which comprise discs having very sharp peripheral edges. The pair of knives 58 are mounted upon a common shaft 60 which is rotatably supported within a preferably bevel gear drive housing 62, see FIG. 2, which projects rearwardly from a tubular housing 64, suitably supported by frame means 66 shown in FIG. 1. A drive sahft 68 is rotatably supported within housing 64 and the driven end thereof projects beyond said housing as shown in FIG. 1. The arrangement within the bevel gear drive housing 62 is such that the knives 58 are driven simultaneously in the direction of the arrow 70 shown in FIG. 1, each of said knives respectively being aligned precisely with the channel 38 formed between the respective pairs of rolls 26, 28 and 30, 32, as shown in FIG. 2.

It is preferred that the slitting of the necks occur as soon as the operation of the paddlewheel 40 has achieved its purpose of aligning the poultry necks within the channel 38. Accordingly, and especially to conserve the overall length of the machine, it will be seen that the blades 52 of the paddlewheel 40 are provided with radially extending slots 72 which are aligned with the knives 58 and permit operation of the peripheries of said knives within said slots without interference during the respective operations of the paddlewheel 40 and the knives 58. The lower edges of the knives 58 accomplish the slitting of the skin upon the poultry necks moving longitudinally within the channels 38 and the mounting of the blades 58 is selected so that adequate slitting of the skin is effected without substantially penetrating the flesh of the necks. Further, it will be seen from the direction of movements of the knives 58, as shown by the arrow 70, that the knives tend to move the necks toward the discharge end of the machine incident to slitting the skin thereon. As soon as the skin has been slit upon the necks moving from the knives 58, the cooperating spiral configurations on the co-operating pairs of rolls 26, 28 and 30, 32, which are moving in the directions indicated by the arrows in FIGS. 3–5, will engage the surface of the skin opposite the slit surface and pull the skin from the remaining portion of the neck through the space between the pairs of co-operating rolls, frequently in somewhat folded, but unmutilated, condition, as shown by the exemplary skin 74 in FIG. 5. Such illustration is intended to be exemplary rather than restrictive. Following the removal of the skins, which are received in a suitable receptacle below the rolls, the skinned necks continue to move along the channels 38 through the discharge or exit end of the rolls.

Referring to FIG. 1, it also will be seen that the discharge ends of the rolls, which are exemplified by roll 32 in FIG. 1, each have a shaft 76 projecting therefrom a limited distance to provide a clearance space between said shafts in order that the skinned necks may drop between the various shafts 76 to another receptacle from that which receives the skins. Also, referring to FIG. 6, and also shown in smaller scale in FIG. 2, one roll of each of the pairs thereof is provided adjacent the discharge end of the rolls with a collar 78 which is formed from suitable synthetic resin and has a cylindrical outer surface, the same being suitably connected, such as by complementary threads, to a reduced diameter portion of the roll. The outer diameter of the collar 78 is no less than, and preferably is substantially equal to, the outer diameter of the roll to which the collar is affixed. Such collars are provided for purposes of having substantially no metal-to-metal contact between the ends of the rolls which are substantially in rolling contact with each other adjacent the exit ends thereof. Any suitable form of snythetic resin resistant to appreciable wear, may be employed for the collars 78.

The power and transmission unit 50 preferably is mounted above the portions of the rolls nearest the exit end of the machine and also the speed reduction portion of said unit is mounted for ready access at the discharge end of the machine as can be best seen from FIGS. 1 and 2. Details of said unit also are shown in end elevation in FIG. 3 and in top plan view in FIG. 7. Such details are as follows.

Frame means 66 extend upward from the side frame members 16 and 18 an appropriate distance to support a horizontal platform 80. An electric motor 82 is supported upon the platform and preferably has a cooling fan 84 associated therewith. The motor has a compound sheave 86, 88 mounted on the outer end of the drive shaft thereof. A pair of shafts 90, 92 also are supported in suitable bearings mounted on platform 80. These respectively have a compound sheave 94, 96 connected to shaft 90 and another sheave 98 connected to shaft 92. The sheave 96 preferably comprises a sprocket gear around which a sprocket chain 100 extends, said chain also extending around a larger diameter sprocket gear 102 which is connected to the shaft at the exit end, for example, of roll 28, as best shown in FIGS. 2 and 3. In view of the fact that the exit ends of the shafts of all of said rolls are interconnected by suitable spur gears, the driving of roll 28 effects corresponding driving of all of the other rolls at similar speeds but respectively in reverse directions.

The large sheave 94 which is connected to shaft 90 has a belt 104 extending therearound and also around the sheave 86 of compound sheave 86, 88 which is connected to the outer end of the drive shaft of motor 82. This establishes the drive between the motor 82 and all of the rolls 26, 28 and 30, 32.

Fixed to the outer end of drive shaft 68 is another driving sheave 106 for purposes of driving the shaft 68 which is connected to the bevel gear drive in housing 62 for purposes of rotating the slitting knives 58. A belt 108 extends around sheave 88 on the shaft of motor 82, sheave 98 on shaft 92, and sheave 106 on shaft 68 to drive the same as aforesaid.

Another bevel gear transmission 110 is supported upon platform 80 and the driven shaft thereof has a sheave 112 connected thereto for reception of a belt 114 which also passes around driving sheave 116 connected to the inner end of shaft 90 as best shown in FIG. 7. Driving sheave 118 of transmission 110 receives belt 48 which drives the paddle-wheel shaft 42.

An additional embodiment of poultry processing machine is illustrated in FIGS. 8–12. This embodiment primarily is designed to remove the skin from parts or pieces of poultry such as those in which the skin does not extend entirely around the piece, as in regard to poultry necks, but rather the edges of the same are unconnected with each other, such as the skin adhering to thighs and the breasts of poultry. Especially in regard to the breasts of poultry, the areas of skin are quite substantial. For greatest efficiency however, and particularly from the standpoint of simplicity in details of a machine to process the same for purposes of removing the skin therefrom, such parts or pieces as thighs and breasts are manually fed to the machine with the skin side thereof lowermost. After the parts or pieces of this type are introduced to the machine however, mechanism is provided for automatically retaining the same engaged upon the skin-striping roll, details of which structure and operation thereof are set forth as follows.

The additional embodiment of the machine illustrated in FIGS. 8–12 may be supported by the same type of structure as the embodiment illustrated in FIGS. 1–7, if desired. Further, said embodiment also includes a substantially rectangular, horizontal frame similar to that of the above-described embodiment and comprising side members 16 and 18, the ends of which are connected together by end members 20 and 22. For purposes of simplicity, only a single pair of rolls 28 and 30 are illustrated in FIGS. 8–12 but it is to be understood that, as in regard to the above-described embodiment, for greater capacity and efficiency, a plurality of pairs of said rolls may be employed in the machine within the purview of the invention.

As in regard to the above-described embodiment, the roll 28 preferably is of substantially uniform diameter throughout its length and the spiral configurations thereon are of a finer pitch than the spiral configurations on the roll 30. Also, the roll 30 is smaller in diameter at the left hand or inlet end of the machine, as viewed in FIGS. 8 and 9, than the diameter at the right hand or discharge end of the machine as viewed in said figures, thus providing between said roll a progressively tapering space or channel 38 which, preferably, diminishes uniformly from a maximum width at the left hand or inlet end of the machine, as referred to above, to no width at the right hand or discharge end of the machine, at which location the ends of the rolls 28 and 30 preferably are in rolling contact with each other, as in the preceding embodiment.

Figure 8:
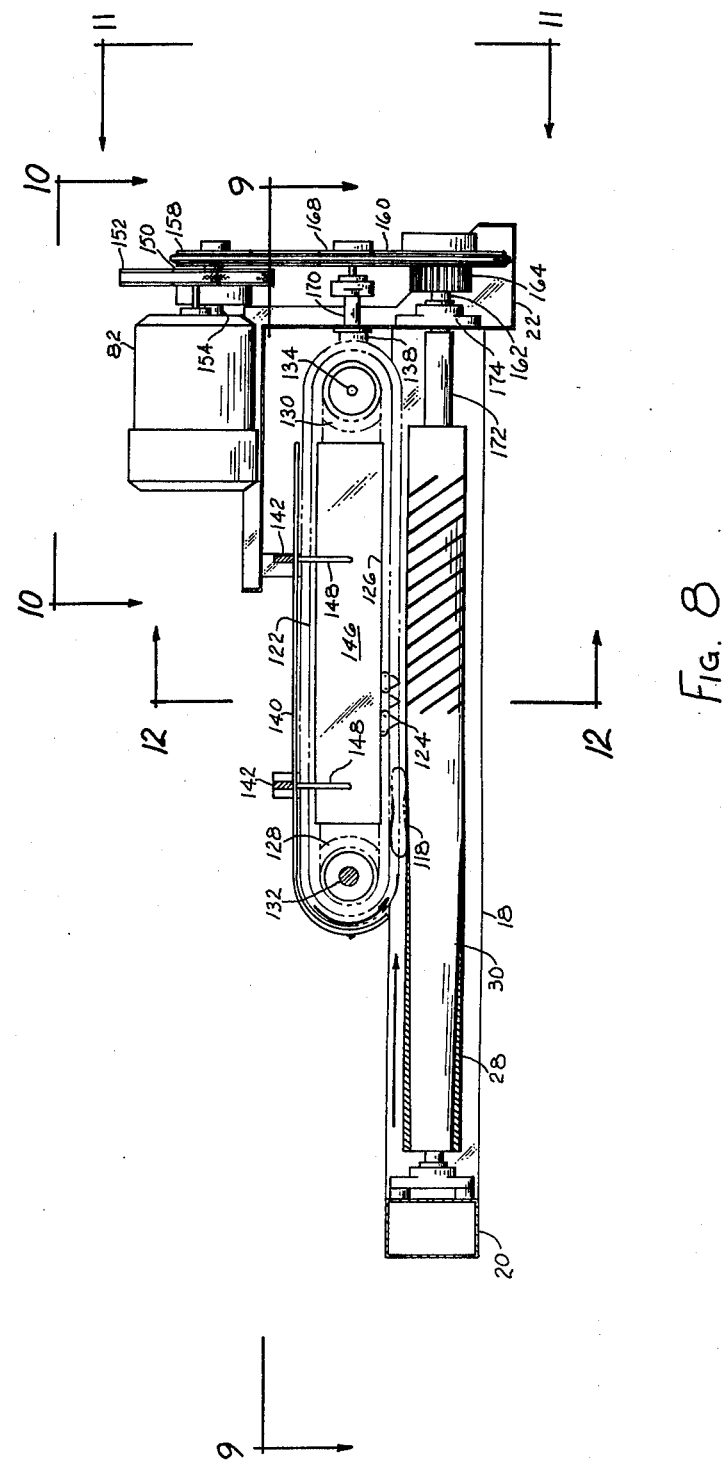
FIG. 8 is a side elevation of another embodiment of a poultry processing machine provided with means to adapt the same to remove skin from parts or pieces of poultry, other than necks, such as thighs and breasts, upon which the skins is of a non-circumferential type.
Figure 9:
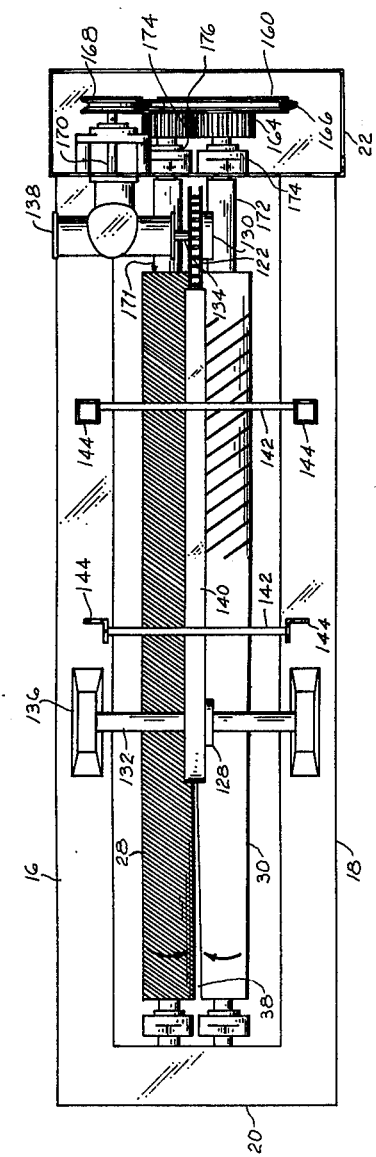
FIG. 9 is a top plan view of the machine shown in FIG. 8, as seen on line 9—9 thereof.
Figure 12:
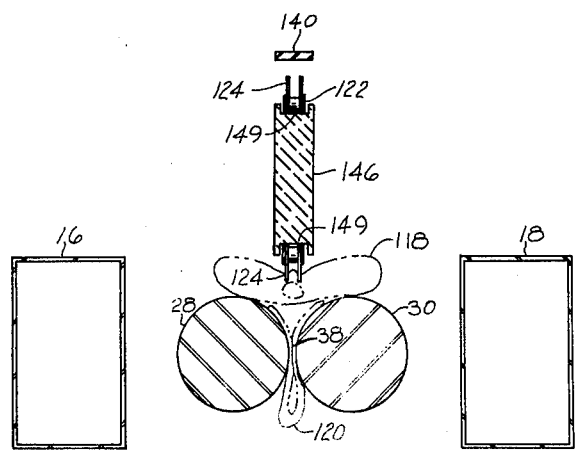
FIG. 12 is a vertical sectional elevation of part of the machine as seen on the line 12—12 of FIG. 8.

The function of the spiral configurations on the rolls 28 and 30 is the same as that of spiral configurations on the rolls 26 and 28 or 30 and 32 of the embodiment illustrated and described relative to FIGS. 1–7. That is, said spiral configurations engage the skin on the parts or pieces of poultry which are fed, skin lowermost, to the rolls 28 and 30 as shown in FIGS. 8 and 9, as well as in FIG. 12. Referring to FIG. 12, an exemplary thigh 118 is shown in cross-section, said figure illustrating in exemplary manner the skin 120 which has been pulled from the flesh portion of the thigh 118 in somewhat folded but unmutilated condition, said skin 120 passing down between the rolls 28 and 30 through the space or passage 38 which is provided between the rolls at locations between the opposite ends thereof where said space or channel still exists and before the same diminishes substantially to zero.

For purposes of facilitating the movement of the parts or pieces of poultry from the inlet to the discharge end of the machine comprising the embodiment shown in FIGS. 8–12, after said parts or pieces are initially introduced manually at the inlet of the machine with the skin surface lowermost for engagement by the rolls 28 and 30, the upper surfaces of said parts or pieces are engaged by the lower course of an endless chain 122 comprising a series of pivotally connected links, at least the majority, if not all of which, are provided with prongs 124 which project outwardly from said links, whereby in regard to the lower course 126 of said chain, the prongs 124 extend downwardly for engagement with the piece of poultry 118 shown in exemplary manner in FIG. 8.

The endless chain 122 extends around supporting and guiding sprockets or pulleys 128 and 130, the pulley or sprocket 130 comprising the driving member of the pair thereof and the opposite one comprising an idler. Said pulleys respectively are supported on shafts 132 and 134. The opposite ends of shaft 132 are supported within bearings in brackets 136 which respectively are supported by the opposite side frame members 16 and 18, as clearly shown in FIG. 9. The shaft 134 is supported by a right-angle gear reduction unit 138, the outline of which is best shown in FIG. 9. The upper course of the endless chain 122 also preferably is covered with a suitable shield 140 which extends longitudinally thereof and is best shown in FIG. 8. The shield 140 is supported by a pair of transverse members 142 which extend between suitable upright supports 144 attached to the side frame member 16 and 18.

Figure 10:
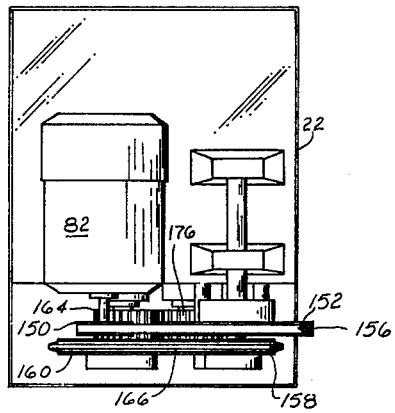
FIG. 10 is a top plan view of the drive mechanism of the machine shown in FIGS. 8 and 9 as seen on the line 10—10 of FIG. 8.
Figure 11:
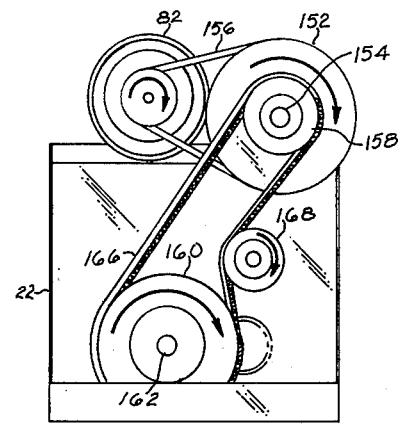
FIG. 11 is an end view of the drive mechanism shown in FIGS. 8-10 as seen on the line 11—11 of FIG. 8.

For purposes of supporting the upper course of the endless chain 122, a longitudinally extending member 146, which may be formed from synthetic resin if desired, underlies said upper course of the chain 122 and is supported by depending members connected at the upper ends thereof to the transverse members 142. Support 146 also has channels 149 in the uppermost surfaces thereof, as shown in FIG. 12, for purposes of guiding the chain 122 during operation of the machine. As in regard to the embodiment of the invention shown in FIGS. 1–7, the principal power for the machine is provided by electric motor 82 which is illustrated in FIGS. 8, 10 and 11, whereas in FIG. 9, the upper portion of the drive mechanism is not illustrated in view of the fact that FIG. 9 is a horizontal sectional plan view as seen on the line 9—9 of FIG. 8. A small pulley 150 is connected to the drive shaft of motor 82 and this drives a larger pulley 152 mounted on shaft 154. One or more belts 156 extends around the pulleys 150 and 152. Fixed to shaft 154 is another relatively small pulley 158 which drives a larger pulley 160 that is fixed to shaft 162 upon which spur gear 164 is mounted. Belt 166 extends around pulleys 158 and 160 and the same is also in driving engagement with a sheave 168 mounted on the end of drive shaft 170 which actuates the right angle gear reduction unit 138 by which the endless chain 122 is driven for purposes of holding the parts or pieces 118 of poultry against the spiral rolls 28 and 30.

The discharge ends of rolls 28 and 30 have shafts 171 and 172 respectively thereon which are of smaller diameter than the discharge end of said roll. The outer ends of said shafts respectively are mounted in bearings 174 and spur gear 164 is connected to the outermost end of shaft 172. Said spur gear 164 also meshes with spur gear 176 which is fixed to the outermost end of shaft 171. The gears 164 and 176 preferably are roller drive gears.

From the foregoing, it will be seen that the electric motor 82 drives not only the rolls 28 and 30 to move the upper surfaces thereof toward each other and therefor rotate said rolls respectively in opposite direction, but the motor also drives the chain 122 which holds the parts or pieces of poultry against the spiral configurations of rolls 28 and 30. The surface speed of the chain 122 preferably is substantially equal to the speed at which the spiral configurations advance the parts or pieces of poultry longitudinally between the inlet and discharge ends of the machine, whereby the spiral configurations have ample opportunity to engage the skin on said parts or pieces of poultry, separate said skin therefrom, and pass the skin downward through the channel 38, usually in smoothly folded condition and intact. Following such removal of the skin from said parts or pieces, said parts or pieces move to the discharge end of the machine, in the region of the reduced diameter shafts 171 and 172 and drop through the spaces between said shafts into appropriate receptacle means, not shown. Simarily, as the skins drop through the channel 38, they also are received in suitable receptacles, not shown.

From the foregoing, it will be seen that the present invention provides a machine for carefully removing the skin from certain parts or pieces of poultry in such manner that the skin remains intact for further processing and the skinned parts and pieces are discharged from the discharge end of the machine following the removal of the skins therefrom. The operation of the machine is automatic and there are fool-proof means in one emboidment of the machine for insuring that the poultry necks will be alinged in appropriate channels between pairs of co-operating rolls which feed the necks forwardly to slitting and skin removing apparatus in the machine. In another embodiment of the machine adapted to remove the skin from parts or pieces of poultry which require no slitting, the machine is provided with means operable effectively to hold the skin surface of the parts or pieces firm against the spiral rolls to insure removal of the skins therefrom, and in intact condition. During the operation, especially in accordance with health requirements as well as desirable operating conditions, the removal of the skin takes place while the parts and pieces are abundantly sprayed with water appropriately supplied to the machine.

While the invention has been described and illustrated in its several preferred embodiments, it should be understood that the invention is not to be limited to the precise details herein illustrated and described since the same may be carried out in other ways falling within the scope of the invention as illustrated and described.

I claim:

1. A poultry processing machine having inlet means adjacent one end and an outlet end adjacent the other end and adapted to remove the skin from parts and pieces of poultry, said machine comprising in combination, a pair of substantially horizontal rolls having spiral configurations thereon extending in opposite directions and positioned adjacent each other in non-contacting relationship and the upper surfaces of said rolls forming a conveying channel to receive adjacent the inlet end of the machine parts and pieces of poultry having skin thereon which is to be removed, means to drive said rolls in opposite rotary directions and operable to move said parts and pieces of poultry along said rolls in a single direction toward the exit end of the machine, and means operable to position said parts and pieces of poultry upon said rolls for engagement of the skin thereon by said spiral configurations on said rolls to effect separation and removal of said skin from said parts and pieces while the same move toward the discharge end of said machine, the peripheries of said configurations being spaced from each other adjacent the inlet end of the machine a distance less than the width of said parts and pieces of poultry to be engaged thereby and at the discharge end being substantially in rolling contact with each other, the space between the configurations on said rolls decreasing substantially uniformly between the inlet and discharge ends of the machine and said space permitting the skin separated from said parts and pieces to pass therethrough in intact condition and the parts and pieces from which the skin has been removed being moved to the discharge end of said machine by said spiral configurations.

2. The machine according to claim 1 further including a slitting knife means positioned in said machine above said channel and operable to slit the skin on poultry necks substantially axially to permit the spiral configurations on said rolls to engage and separate the slit skins from said necks in intact condition and move the skins through said space between said rolls for discharge from the machine.

3. The machine according to claim 2 in which said means operable to position said parts and pieces comprises rotary means nearer the inlet of said machine than said knife means and comprising a plurality of substantially radially extending blades driven about a horizontal axis extending transversely across said channel.

4. The machine according to claim 3 in which the outer ends of the radical blades of said rotary means cooperate with the upper portions of said pair of horizontal rolls to define a space shaped to allow passage of said poultry necks passing therebetween.

5. The machine according to claim 3 in which the ends of said blades of said rotary means are provided with slots extending perpendicularly to the axis of said rotary means and positioned to permit passage of said slots in said rotary means past said slitting knife means therethrough during operation of the machine.

6. The machine according to claim 5 in which one roll of each pair of rolls is substantially uniform in diameter throughout the length thereof and the other roll is slightly tapered from the inlet end toward the outlet end, the smaller diameter of said roll being adjacent the inlet end of the machine and the axes of said rolls being substantially parallel, whereby the difference in diameters of the opposite ends of said other roll provides said uniformly decreasing space between the spiral configurations on said rolls.

7. The machine according to claim 5 in which one of said rolls is provided with a cylindrical collar at the exit end thereof formed from synthetic resin, said collar being of substantially the same diameter as the exit end of said roll, and means supporting said exit ends of said rolls in bearings positioned to permit said cylindrical collar of said one roll to have rolling contact with said other roll to thereby maintain the exit ends of said rolls out of contact with each other.

8. The machine according to claim 1 in which said means to position includes a rotary blade unit adapted to orient poultry necks introduced to the machine at the inlet end thereof and received in said channel, a rotary disc skin-slitting knife positioned rearwardly of said rotary blade unit relative to the direction of feed in said machine, power means mounted above said rolls and interconnected to said knife to rotate the same within a substantially vertical plane, and a transmission assembly connected to said power means and also interconnected to said neck orienting rotary blade unit and said rolls by said transmission assembly, said assembly including endless flexible drive means extending around rotatably mounted driven members respectively connected to said neck orienting rotary blade unit and knife and the rolls which form said channel, said transmission assembly being mounted adjacent the exit end of said machine.

9. The machine according to claim 8 in which two pairs of said channel-forming rolls are provided to form a pair of parallel similar channels, a pair of said rotary disc skin-slitting knives supported upon a common shaft and respectively intersecting the channels of said pairs of rolls to slit the skin of poultry necks passing along said channels, a belt between said power means and said rotary blade operable to drive the same by said power means, a bevel gear drive unit connected to said shaft for said pair of slitting knives, a longitudinally extending shaft connected to said bevel gear drive and extending toward the exit end of said machine, and means interconnecting the end of said longitudinally extending shaft to said transmission assembly to effect driving of said shaft to rotate said knives in a predetermined desired direction.

10. The machine according to claim 1 in which said means to position said parts and pieces of poultry upon said rolls comprise longitudinal means extending axially along said rolls above said channel formed thereby, said longitudinal means being engageable with the upper surfaces of said parts and pieces of poultry arranged in said channel to insure positive engagement of said skin by the spiral configurations on said rolls as said parts and pieces of poultry are moved along said channel.

11. The machine according to claim 10 in which said longitudinal means comprises endless flexible means arranged to move along said channel longitudinally in engagement with the upper surfaces of said parts and pieces of poultry as the same are moved toward the discharge end of the machine by the operation of said rolls.

12. The machine according to claim 11 in which said endless flexible means comprises a chain having projections extending outwardly and adapted to impinge the flesh of said poultry parts and pieces to effect positive engagement of the skin thereon by said spiral configuration on said rolls, said machine also including means to drive said chain at a speed commensurate with the speed at which the poultry parts and pieces are advanced by said spiral configurations on said rolls.

13. The machine according to claim 12 further including guide means for said chain supported fixedly by said machine and having longitudinally extending surfaces along which courses of said chain move slidably for guidance.

14. The machine according to claim 11 further including drive means for said endless flexible means and said drive means also being interconnected to said rolls to revolve the same in opposite directions.

15. The machine according to claim 14 wherein said drive means further includes transmission means comprising pulleys and belts adjacent the discharge end of said machine, and an electric motor connected to said transmission means to operate the same.

* * * * *